United States Patent [19]
Lindberg

[11] Patent Number: 5,509,999
[45] Date of Patent: *Apr. 23, 1996

[54] TREATMENT OF BLEACH PLANT EFFLUENTS

[75] Inventor: Hans G. Lindberg, Glens Falls, N.Y.

[73] Assignee: Kamyr, Inc., Del.

[*] Notice: The term of this patent shall not extend beyond the expiration date of Pat. No. 5,401,362.

[21] Appl. No.: 195,139

[22] Filed: Feb. 14, 1994

Related U.S. Application Data

[63] Continuation-in-part of Ser. No. 113,645, Aug. 31, 1993, which is a continuation-in-part of Ser. No. 35,478, Mar. 24, 1993, Pat. No. 5,401,362.

[51] Int. Cl.⁶ .................................................. D21C 11/00
[52] U.S. Cl. ........................... 162/29; 162/30.1; 162/37; 162/38; 210/712; 210/724; 210/912; 210/919; 210/928
[58] Field of Search ...................... 162/29, 30.1, 30.11, 162/65, 63, 40, 37; 210/928, 919, 724, 712, 912, 705

[56] References Cited

U.S. PATENT DOCUMENTS

| | | | |
|---|---|---|---|
| 4,196,043 | 4/1980 | Singh | 162/65 |
| 5,338,460 | 8/1994 | Yen . | |
| 5,348,662 | 9/1994 | Yen et al. | 210/912 |
| 5,360,514 | 11/1994 | Henricson | 162/31 |
| 5,401,362 | 3/1995 | Lindberg | 162/65 |

FOREIGN PATENT DOCUMENTS

| | | |
|---|---|---|
| 0151097 | 8/1985 | European Pat. Off. . |
| 0307295 | 3/1989 | European Pat. Off. . |
| 0564443 | 10/1993 | European Pat. Off. . |
| 9301161 | 10/1994 | Sweden . |
| WO88/04706 | 6/1988 | WIPO . |

OTHER PUBLICATIONS

Pp. 371 and 372 of Smook "Handbook for Pulp and Paper Technologists", 1989.

Kubelka, "Absorption and desorption of gases during green liquor carbonation", pp. 269–278.

Saiha, "The adaptability of the Tampella Recovery Process", pp. 635–658.

Nishizawa et al, "Chemical recovery process by direct carbonation of smelt", p. 659 (Abstract).

*Primary Examiner*—Steven Alvo
*Attorney, Agent, or Firm*—Nixon & Vanderhye

[57] ABSTRACT

The removal of bleaching chemical-consuming metals from treatment fluids in a cellulose pulp mill is facilitated by treating the pulp in an acidic or neutral stage to dissolve metals, washing or thickening the pulp to produce a filtrate containing dissolved metals, and then using an alkali liquid to adjust the pH of the filtrate to cause dissolved metals to precipitate. The alkali liquid is pretreated with carbon dioxide to reduce the sulfide content and increase the carbonate content thereof, preferred alkali liquids being green liquor and white liquor. The reduced-metal content filtrate is used in the bleach plant of the pulp mill, to make bleaching chemicals, as a wash liquid, etc. Treatment of the alkali liquid with carbon dioxide is typically practiced by scrubbing the liquor with carbon dioxide gas, for example, using a plate column scrubber or a stationary packing scrubber.

20 Claims, 4 Drawing Sheets

TREATMENT OF BLEACH PLANT EFFLUENTS

CROSS-REFERENCE TO RELATED APPLICATION

This application is a continuation-in-part of application Ser. No. 08/113,645 filed Aug. 31, 1993, which in turn is a continuation-in-part of Ser. No. 08/035,478 filed Mar. 24, 1993, now U.S. Pat. No. 5,401,362.

BACKGROUND AND SUMMARY OF THE INVENTION

The parent applications show a method and apparatus for minimizing adverse environmental impact of the production of kraft pulp, or the like, by bleaching the pulp without chlorine or chlorine-containing liquids, and removing metals (such as Mn, Fe and Cu) to prevent buildup of those metals to a level adversely affecting the bleaching reactions. Basically, according to the parent applications an acidic liquid stream, such as washer filtrate following a bleach plant acidic stage, is treated with alkaline material containing carbonate in a reactor so that the pH is raised to a point where much of the dissolved metal in the filtrate precipitates out, and the precipitated metals are removed by optional clarification and/or filtration. The carbonate primarily controls the calcium level of the filtrate, but also provides pH control and aids in the precipitation of Ca, Mn, etc. The parent applications also show a method and apparatus for oxidizing the filtrate to increase the valence of the metals (like Mn and Fe) so that they become easier to precipitate or flocculate.

In the parent applications, preferred alkali liquids for increasing the pH of acidic bleach plant effluents so that the metals dissolved in the effluents readily precipitate out of solution are green liquor and white liquor. While both of those liquors are excellent mediums for facilitating precipitation of the dissolved metals, and are readily available in the mill, if the metal-depleted filtrate produced thereby is to be used in the bleach plant of the pulp mill, there can be disadvantages associated with the use of green liquor or white liquor. Both green liquor and white liquor contain undesirable amounts of bleaching chemical-consuming sulfides, such as dissolved hydrosulfide ions ($HS^-$) and thiosulfate ($S_2O_3^{2-}$). In order to avoid the consumption of bleaching chemical by sulfides, yet retain all of the advantages (such as carbonate ion addition) associated with the use of green liquor or white liquor as the alkaline liquids for effecting precipitation, according to the present invention, a simple, advantageous, yet effective process and apparatus are employed for removing the chemical-consuming sulfides and increasing the carbonates so that the filtrate can be used anywhere in the pulp mill, including in the bleach plant (e.g. as a wash liquid, to manufacture bleaching chemical, etc.).

According to the present invention, the green liquor or white liquor is treated with carbon dioxide gas in conventionally available equipment. Carbon dioxide gas is readily available as a by-product of combustion processes already existing in the mill, such as in the recovery boiler, hog-fuel boiler, or lime kiln. Also, carbon dioxide is readily available commercially. By treating the green liquor or white liquor with carbon dioxide gas according to the invention not only are the sulfides removed therefrom, the carbonate content of the liquid increases, which is very desirable, since it reduces the solubility of manganese and calcium so that those metals will more readily precipitate when the pH of the effluent is increased. Also, the additional carbonate extends, or lowers, the pH range in which the metals will precipitate.

According to one aspect of the present invention, a method of removing bleaching chemical-consuming metals from treatment fluids in a cellulose pulp mill having a bleach plant is provided comprising the steps of substantially continuously: (a) Treating digested pulp in an acidic or neutral stage to dissolve metals. (b) Washing or thickening the pulp after step (a) to produce a filtrate containing dissolved metals. (c) Treating an alkali liquid containing bleaching-chemical-consuming sulfides with carbon dioxide to reduce the sulfide content and to increase the carbonate content of the alkali liquid. (d) Using the alkali liquid produced in step (c) to adjust the pH of the filtrate from step (b) to cause dissolved metals to precipitate as solids in the pH adjusted filtrate. (e) Removing the precipitated solids from the filtrate. And, (f) using the reduced metal content filtrate from step (e) in the bleach plant or wherever it is needed in the pulp mill.

Step (c) is desirably practiced by treating green liquor or white liquor so as to remove dissolved hydrosulfide ions therefrom, by absorbing $CO_2$ gas into the liquid such as by scrubbing the liquor with carbon dioxide gas (typically using a plate column scrubber, a stationary packing scrubber, or like commercially available gas-liquid contacting equipment).

Step (e) is typically practiced by filtration, flotation, or sedimentation. Also there may be the further step of oxidizing the filtrate from step (b) prior to step (d) in order to increase the valence of the dissolved metals so that they become easier to precipitate or flocculate. The carbon dioxide gas used in step (c) is typically produced during combustion in a recovery boiler, hog-fuel boiler, or lime kiln of the pulp mill, although it can be purchased from an outside source. If the filtrate is not oxidized, step (d) is practiced to adjust the pH so that it is in the range of about 8–11, while if the filtrate is oxidized, the pH in step (d) is adjusted so that it is in the range of about 6–11. Steps (a) through (f) may be practiced to produce a filtrate having a carbonate level of at least about 0.05 moles per liter.

According to another aspect of the present invention a method of treating digested kraft pulp is provided comprising the following steps: (a) Oxygen delignifying the kraft pulp. (b) Treating the oxygen delignified pulp in an acidic stage. (c) Washing or thickening the pulp after step (b) to produce a filtrate. (d) Treating green liquor or white liquor containing bleaching chemical-consuming sulfides with carbon dioxide to reduce the sulfide content and to increase the carbonate content of the liquor. (e) Using the liquor from step (d) to adjust the pH of the filtrate from step (c) to cause dissolved metals to precipitate as solids in the pH adjusted filtrate. And, (f) removing the precipitated solids from the filtrate.

The invention also relates to an apparatus for removing bleaching chemical-consuming metals from treatment fluids in a cellulose pulp mill having a bleach plant. The apparatus comprises the following elements: Means for treating digested pulp in an acidic or neutral stage to dissolve metals. Means for washing or thickening the pulp from the treating means to produce a filtrate containing dissolved metals. Means for treating an alkali liquid containing bleaching chemical consuming sulfides with carbon dioxide to reduce the sulfide content and to increase the carbonate content of the alkali liquid, the means comprising means for absorbing the carbon dioxide gas into the alkali liquid (e.g. by scrubbing). A reactor for combining the alkali liquid, produced by the means for treating an alkali liquid, with the filtrate to adjust the pH of the filtrate to cause dissolved metals to precipitate as solids in the pH adjusted filtrate. And, means for removing the precipitated solids from the filtrate.

It is the primary object of the present invention to facilitate the effective removal of metals from treatment fluids in cellulose pulp mills which adversely affect the bleaching reactions, while at the same time producing a treated filtrate that is optimal for use anywhere in the pulp mill including the bleach plant. This and other objects of the invention will become clear from an inspection of the detailed description of the invention, and from the appended claims.

DETAILED DESCRIPTION OF THE DRAWINGS

Figure 1:
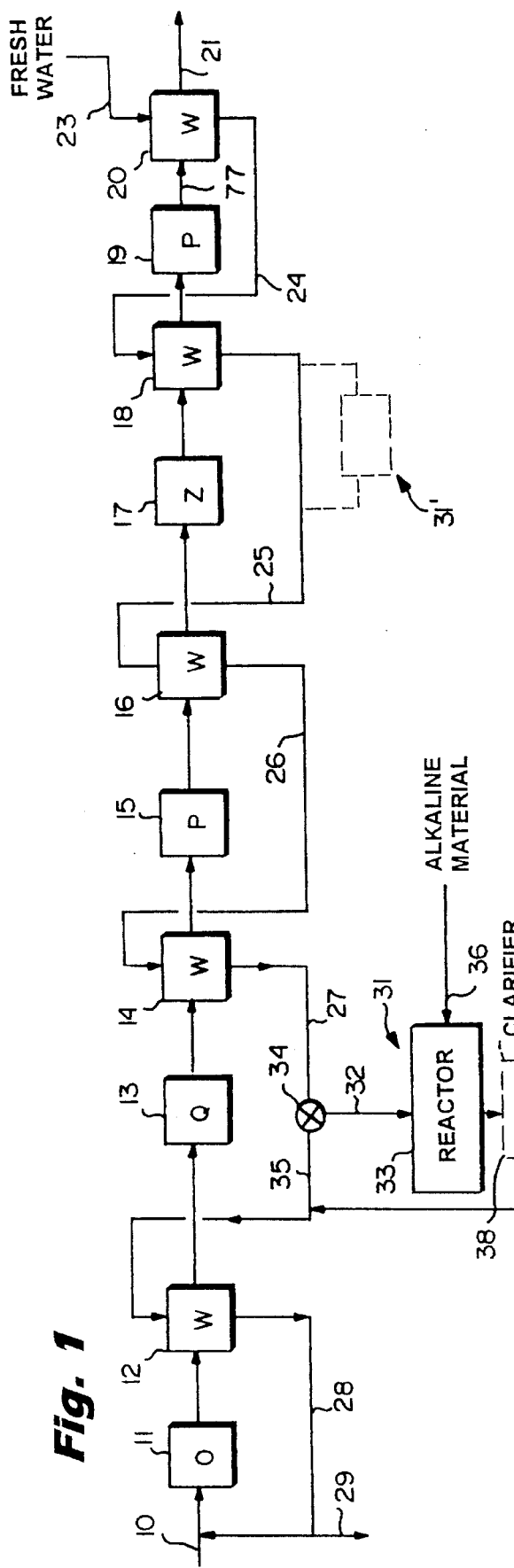
FIG. 1 is a schematic illustration of an exemplary bleaching sequence for kraft pulp utilizing metals removal according to the parent application.

In FIG. 1, digested pulp, e.g. from a continuous kraft digester, in line 10 is acted upon to effect delignification and bleaching thereof. This is accomplished by continuously removing metal ions (such as manganese, zinc, cobalt, iron, and copper) which adversely affect bleaching selectivity and consume bleaching chemicals (particularly ozone, peroxide, and oxygen) from an acidic effluent stream so as to minimize chemical consumption during bleaching. The metal-depleted alkaline effluent stream is then used as needed in the fiberline, including in the bleach stages.

In the embodiment illustrated in FIG. 1, the pulp in line 10 passes to oxygen reactor 11 where oxygen delignification takes place, and then the oxygen delignified pulp is subjected to a wash or thickening in washing or thickening stage 12, which produces a filtrate. After stage 12 it passes to a chelating stage 13, e.g. an EDTA stage, an acid only stage, a combination EDTA-acid stage, etc. In the chelating stage 13, the pulp is subjected to an acidic or neutral treatment, dissolving transition metals or making them easier to remove. After the stage 13 the pulp is washed or thickened as indicated at stage 14, and then passes to various bleaching stages. For the particular sequence illustrated in FIG. 1, there is a first peroxide stage 15, followed by a wash 16, then a first ozone stage 17, followed by a wash 18, and then a second peroxide stage 19 followed by a final wash 20, the digested, delignified, bleached, and washed pulp of desired brightness that is produced being discharged in line 21. A number of modifications may be made of the bleaching sequence according to the invention, for example a ZEZP sequence may be utilized (the E stage may be an $E_{op}$ stage), with or without a chelating stage before the first Z stage, or a wide variety of other bleaching sequences may be utilized including a TCF sequence, or a D sequence.

In the practice of the exemplary method schematically illustrated in FIG. 1, fresh wash water is added at 23, and then the wash water or filtrate from each subsequent stage is used as wash water in a previous stage. For example, in the embodiment illustrated in the drawing wash water 24 from stage 20 is used in stage 18, wash water in line 25 from stage 18 is used in stage 16, and wash water in line 26 from stage 16 is used in stage 14, and wash water in line 27 from stage 14 is used in stage 12. Fresh water can be utilized with various other washing stages besides the stage 20, as necessary, and the filtrate lines from each of the washing stages need not pass back to exactly the preceding stage, but to an earlier preceding stage (e.g. from one alkaline stage to another). The filtrate from stage 12 may be recirculated in line 28 to be added to the pulp, or may be otherwise treated as shown schematically by line 29.

An exemplary treatment sequence is shown schematically and generally by reference numeral 31 in FIG. 1. In FIG. 1, the sequence 31 is shown in association with the Q (chelating) stage 13, but it may be utilized in association with an (or more than one) acidic stage, such as shown at 31' in FIG. 1 (there associated with a Z stage).

The sequence 31 has as the input thereof filtrate from line 27, which passes in line 32 to a reactor 33. A valve 34 may be provided in the line 27 for diverting a substantial portion of the filtrate in line 27 to the line 32, while allowing other filtrate—e.g. in line 35—to pass directly to the stage 12 without treatment. Typically at least about half of the filtrate in line 27 is diverted by valve 34 to line 32, but anywhere from about 25–100% maybe diverted into lines 32.

In the reactor 33 alkaline material is added as indicated at 36 to adjust the pH of the filtrate so that it is greater than 8 (preferably greater than 10.5, and in a typical situation about 10–11), such a high pH causing the transition metals that were dissolved in stage 13, which have been washed out into filtrate from wash or thickening stage 14 into filtrate line 27, to precipitate out. The desired pH is metal-content dependent and also depends upon whether a chelant is used and which one (e.g., EDTA or DTPA). The alkaline material added in line 36 maybe from a wide variety of alkali sources, such as a calcium source including lime (including reburned lime, slaked lime, $CaCO_2$, $Ca(OH)_2$, $CaO$, and the like), lime mud, lime milk, slaker grits, alkali bleach plant effluent (e.g. from a peroxide stage), clarified or unclarified green liquor, and/or clarified or unclarified white liquor. (The green and white liquors may be oxidized or unoxidized.)

It is desirable that at least some of the alkali material added in line 36 have a high enough concentration of carbonate ions so as to keep the calcium content to a minimum. Alkaline materials with carbonate ions include green and white liquor. The alkaline material may also be provided in the form of carbonate from carbon dioxide. The $CO_2$ may be obtained from any mill combustion process, e.g. the lime kiln, recovery boiler or hogged fuel boiler, or can be obtained from a commercial source (e.g. as a liquid). If in gaseous form, the $CO_2$ can be bubbled through the effluent, or can be scrubbed with effluent in a conventional scrubber (not shown) prior to reactor 33. Preferably during the practice of the sequence 31 a filtrate carbonate content of at least about 0.01 moles per liter, and preferably about 0.05 moles per liter, is provided, the amount of carbonate ion added to reactor 33 is dependant upon the amount of carbonate ion already present in the filtrate in line 27.

It is preferred that the filtrate be maintained at a particular temperature for a particular period of time, at the desired alkaline pH conditions, in the reactor 33 in order to ensure sufficient precipitation of the manganese, iron, copper, zinc, cobalt, and like metal ions from the originally acidic filtrate. The temperature at which reaction takes place and the time of reaction are dependent upon the source of the acidic effluent. If the source is an ozone stage the effluent arrives at the reactor at about 30°–70° C. and requires about 40–60 minutes reaction time. If the source is a chelating stage, the effluent arrives at the reactor at about 70°–90° C. and requires about 10–40 minutes reaction time. If it is desired to speed up the reaction (reduce the time in reactor 33) the filtrate in line 32 may be heated above the temperatures indicated above (e.g. with steam in an indirect heater). Furthermore, precipitation is enhanced by maintaining a minimum concentration of suspended solids in the treatment reactor. The alkaline sources containing particulate men- Table I below summarizes laboratory trials for treating a Z-stage effluent in accordance with the present invention. In these laboratory trials, 100 ml filtrate samples were mixed with various concentrations of lime mud, slaker grits, and green liquor. The green liquor carbonate concentration was 1.44 moles/L. The mixtures were held at 40° C. for the times specified in Table I, and the ion concentrations of certain metals were determined, as listed. When comparing those samples for which broad metal analyses were done to the baseline sample (the first sample), it will be seen that there is very effective metals removal according to the invention (note that the increase in potassium concentration is insignificant as far as effectiveness of subsequent bleaching is concerned).

That is, for the two samples according to the invention in Table I for which a complete analysis was done the metal removal efficiencies were as follows: for Ca, 80% and 91%; for Mn, 98% and 98+%; for Fe, 86% and 91%.

TABLE I

| Sample Volume | Lime Mud | Slaker Grits | Green Liquor | Holding Time | pH | Conc Ca | Conc Mg | Conc K | Conc Mn | Conc Fe | Conc Ba | COD |
| --- | --- | --- | --- | --- | --- | --- | --- | --- | --- | --- | --- | --- |
| 100 ml | | | | 10 min | 2.5 | 171 | 40 | 7.3 | 4.9 | 2.2 | <0.5 | .730 |
| 100 ml | 20.0 g/L | | | 10 min | 11.7 | 110 | | | | | | |
| 100 ml | 20.0 g/L | | 0.1 ml | 10 min | 11.8 | 105 | | | | | | |
| 100 ml | 20.0 g/L | | 0.7 ml | 10 min | 12.3 | 70 | | | | | | |
| 100 ml | 20.0 g/L | | 0.7 ml | 60 min | 12.3 | 35 | | | | | | |
| 100 ml | 20.0 g/L | | 7.0 ml | 10 min | 12.8 | 53 | | | | | | |
| 100 ml | 20.0 g/L | | 7.0 ml | 60 min | 12.8 | 34 | 0.2 | 1315 | 0.1 | 0.3 | <0.5 | 2620 |
| 100 ml | | 20.0 g/L | | 10 min | 11.9 | 1081 | | | | | | |
| 100 ml | | 20.0 g/L | 1.0 | 10 min | 12.2 | 476 | | | | | | |
| 100 ml | | 20.0 g/L | 0.7 | 10 min | 12.3 | 590 | | | | | | |
| 100 ml | | 20.0 g/L | 7.0 | 10 min | 13.0 | 44 | | | | | | |
| 100 ml | | 20.0 g/L | 7.0 | 60 min | 13.0 | 15 | 0.1 | 1155 | <0.1 | 0.2 | <0.5 | 2330 | tioned above, e.g. lime mud, slaker grits, etc., can be added to maintain the concentration of suspended solids.

One of the functions of such a reactor 33 is to gently agitate the reaction mixture to maintain the level of suspended solids and enhance precipitation.

The type of reactor 33 may vary widely, but preferably is a slaker type reactor, or a liquid fluidized bed where the bed is made up of lime mud or grits, and the bed aids in precipitation.

After treatment in reactor 33, the solid phase (precipitate) of the metal ions must be removed as efficiently as possible. An optional clarifier 38 may be used before the filtrate with precipitated solids is fed to the filter device 39. The conventional clarifier 38 is necessary if the filter 39 is a polishing type filter. The clarifier 38 is not necessary, through it may be desirable, if the filter 39 is a precoat filter of drum, disc, or planar type. The filter 39 may be a conventional drum filter.

The sludge from filter 39 passes in line 40 to further treatment, such as to recovery where it may be burned in the lime kiln to consume the organics and some of the metals can be removed via the purging of the lime, or to disposal. The filtrate in line 41, which has been filtered by filter 39, has a greatly reduced transition metal ion content compared to the filtrate in line 27, and may be used at a wide variety of locations within the mill. Preferably, line 41 connects back up to line 35, and the filtered filtrate is used in the wash stage 12 after the oxygen delignification stage 11 (an alkaline stage). Some part of the liquid in line 41 may pass to typical green liquor production stage 42, or will be otherwise used as necessary.

During the treatment of the pulp in the various stages 13, 15, 17, 19, it is preferred, although not necessary, that the pulp be at medium consistency (e.g. about 6–18%). While the method is particularly advantageous for kraft pulp, it may be utilized for other chemical pulps, thermomechanical pulp, chemimechanical pulp, etc.

While an OZPZP sequence is illustrated in FIG. 1, it is to be understood that many other sequences also could be utilized (e.g. as two of many examples, OZ(Eop)ZP, or OPZP).

Figure 2:
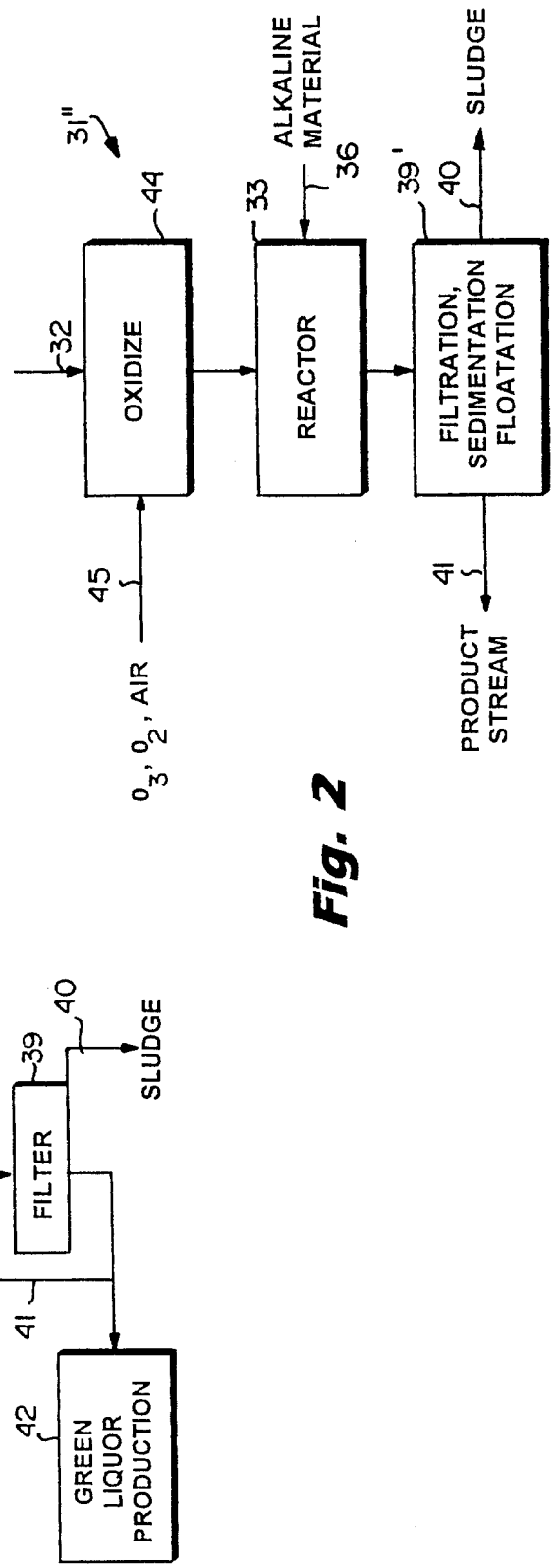
FIG. 2 is a detailed schematic of part of the illustration of FIG. 1 schematically showing an oxidizing apparatus and method step.

FIG. 2 shows a modification for making it easier to precipitate metals out of the acidic liquid (filtrate) containing metals, typically obtained by washing or thickening in the bleach plant. In the FIG. 2 embodiment of the sequence 31", means 44 for oxidizing the filtrate in line 32 is provided before reactor 33. The oxidation means 44 brings the filtrate into intimate contact with hydrogen peroxide, ozone, air, oxygen, or combinations thereof indicated at 45 in FIG. 2, to thereby increase the valence of the metals in the filtrate so that they become easier to precipitate or flocculate. That is, after oxidation at 44, the metals precipitate at lower pHs and the species formed have lower solubility at a given pH than the species predominant in the unoxidized filtrate. For example, Mn 2+ when oxidized becomes Mn 3,4+, and Fe 2+ when oxidized becomes Fe 3+. The "Pourbaix Diagrams" for these metals indicate the relative predominance of various species ("redox couples") based upon the electro-chemical potential, Eo, and pH. The higher the potential, the stronger the oxidizing agent required to obtain the species indicated. For example, for iron, at a pH of 7 the predominant redox couple is Fe 2+—Fe(OH)3. Fe 2+ is soluble ion existing in solution while Fe(OH)3 is an insoluble solid. As the pH is increased (e.g. to 10–12), the more stable species is Fe(OH)3. However, if the solution is oxidized, i.e. the potential Eo is increased, the insoluble Fe(OH)3 becomes more predominant or is more likely to form even at neutral or even a slightly acidic pH. Thus metal precipitation is enhanced not only by increasing pH, but also by oxidation.

After oxidation at 44, the metals are easier to precipitate out of the filtrate, and in fact will start precipitating even at a pH as low as 6. It is desirable to have the pH within the range of about 6–11, preferably 8–11, to insure effective precipitation of all metals. As in the FIG. 1 embodiment, carbonate ion is also preferably added in reactor 33 when the pH is adjusted to control the calcium level in the filtrate. While the apparatus and method are described with respect to the oxidation stage 44 preceding reactor 33, it is to be understood that they may be practiced simultaneously in the same vessel, or alkaline treatment may be performed even before oxidation. Simultaneous treatment may be followed by another alkaline treatment.

It is noted that the reference to the liquids treated according to this disclosure as "acidic" includes a slightly acidic pH range (the chelation range of 5.5–6.0).

As indicated in FIG. 2, after pH adjustment (and carbonate ion addition) in reactor 33, the metals which have precipitated are removed, by conventional filtration, sedimentation, or flotation means 39', producing a product stream 41 used elsewhere in the pulp mill, and the sludge 40.

Figure 3:
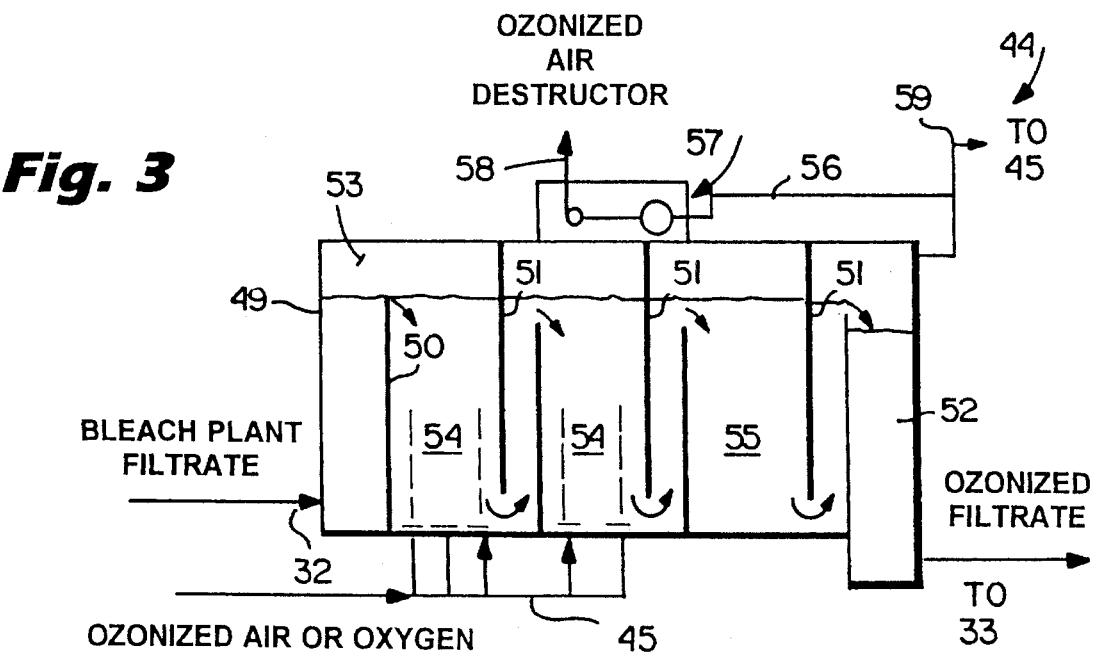
FIG. 3 is a schematic side cross-sectional view of a gas-contact reactor that may be used to practice an oxidation step.
Figure 4:
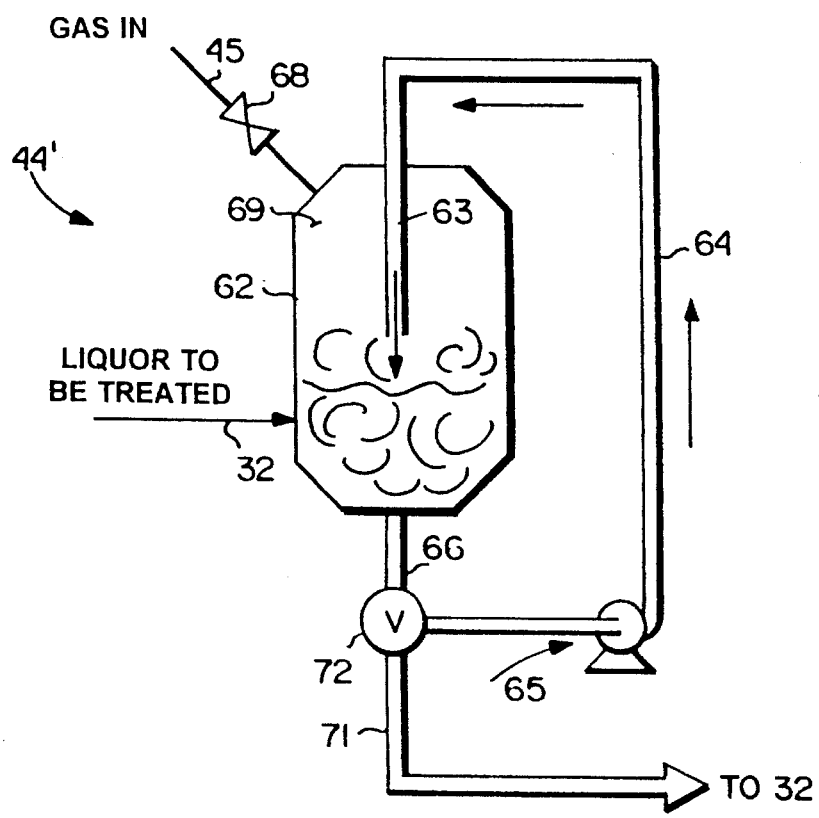
FIG. 4 is a view like that of FIG. 3 for a plunger type reactor that may be used instead of the reactor of FIG. 3.

The oxidation means 44 may comprise a gas-contact reactor, such as illustrated in FIG. 3, or a plunger type reactor, as illustrated in FIG. 4. The oxidation means 44 is not typically necessary for treating filtrate after a Z stage (see 31' in FIG. 1).

Where the oxidizing fluid is hydrogen peroxide (a liquid) it may contact the filtrate in any conventional mixer, for example a static mixer or a stirred. The peroxide may be obtained as filtrate from a P bleach stage.

The gas-contact reactor of FIG. 3 is illustrated as a conventional ozone contactor design, although other oxidizing gases may also be utilized therewith. The ozonized air or oxygen is added at 45 in FIG. 3 to the bottom of vessel 49 having some walls 50 extending upwardly from the bottom of vessel 49, and others 51 supported with their lower portions above the bottom of vessel 49. Product filtrate is discharged at outlet 52. A gas volume 53 (oxygen and residual ozone) is maintained above the level of filtrate in vessel 49. Sparging chambers 54 are where the ozone is introduced, while the chamber 55 adjacent the discharge 52 typically has no sparging therein, but is for residence and further mixing. There is a continuous flow of filtrate from 32 to 52, and a continuous flow of gas into 45. Residual gas, depleted in ozone, passes in line 56 to an ozone destruct apparatus 57 (with substantially ozone-free gas being discharged in line 58), and/or is recycled in line 59 to inlet 45. The source of gas for 45 may be an ozone generator, vent gas from an ozone bleaching stage, ozone-enriched vent gas from an ozone stage, or from any other ozone consumer in the pulp mill. Oxygen, air, peroxide, etc., may be from any conventional source.

The plunger type reactor 44' of FIG. 4 may be used as oxidation means 44 of FIG. 3. The designation "plunger" refers to the fact that recirculating liquid plunges into a liquid level maintained in the reactor, providing agitation which exposes the liquid to oxidizing gas maintained at a predetermined pressure above the liquid level. Specifically, reactor vessel 62 has the inlet 32 for filtrate to be treated essentially at or below the level of liquid (filtrate) maintained in the vessel 62, and inlet 45 for oxidizing gas, adjacent the top of the vessel 62. Downwardly extending pipe 63 introduces recirculated liquid that "plunges" into the liquid in the vessel 62, causing agitation, and then exposure of the liquid to the oxidizing gas in atmosphere 69. Pipe 63 is connected by pipe 64 to pump 65, in turn connected to pipe 66 coming from the bottom of the vessel 62. The pump 65 essentially continuously recirculates a part of the liquid maintained in the vessel 62. Valve 68 in conduit 45 may be used to control the introduction of oxidizing gas. The valve 68 may operate in response to the pressure in the volume 69 (related to the extent to which the liquid is oxidized). A valve 72 may be provided to divert some liquid from line 66 to the pump 65 to be recirculated, and another part of the liquid into conduit 71 to pass to reactor 33.

In the operation of the plunger type reactor 44', the pH may be monitored and adjusted with the addition of lime or lime mud to the reactor 62 (for substantially simultaneous oxidation and pH adjustment).

Figure 5:
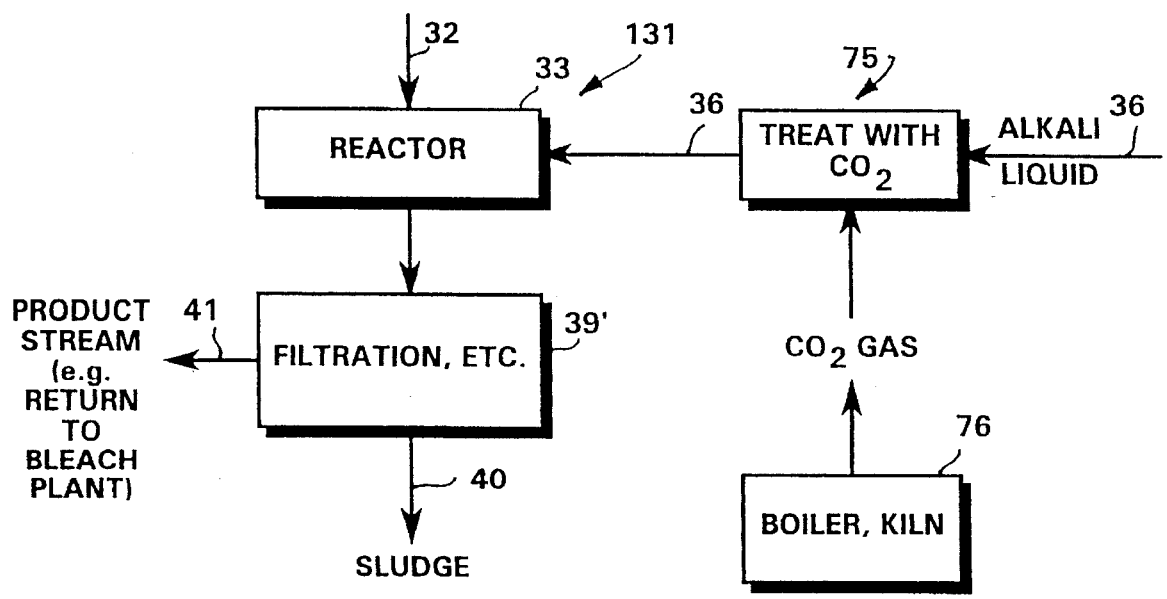
FIG. 5 is a schematic view like that of FIG. 2 only showing the method step and apparatus for removing sulfides from alkali treatment liquid, according to the present invention.

FIG. 5 illustrates schematically exemplary apparatus according to the present invention for removing bleaching chemical-consuming metals utilizing an alkali liquid while pretreating the alkali liquid to remove bleaching chemical-consuming sulfides therefrom. The apparatus in FIG. 5 is shown generally by reference numeral 131, and components identical to those in the FIGS. 1 and 2 embodiment are shown by the same reference numeral, to which attention is directed.

In the apparatus of FIG. 5, the alkali liquid in line 36 is an alkali liquid containing bleaching chemical-consuming sulfides. Most desirably it is green liquor or white liquor which has dissolved hydrosulfide ions therein. Those hydrosulfide ions will transfer to the filtrate produced in line 41 and therefore make the filtrate in line 41 undesirable for use in the bleach plant (although it may be used elsewhere in the pulp mill). In order to make the filtrate in line 41 suitable for use anywhere in the pulp mill, including the bleach plant, the alkali liquid in line 36 is treated in the treatment apparatus 75 with carbon dioxide.

As schematically illustrated in FIG. 5, carbon dioxide gas—which may be from any source but is shown in FIG. 5 to be combustion gas from a boiler (e.g. recovery boiler or hog-fuel boiler, or kiln) (e.g. a lime reburning kiln) 76 which already exists in the pulp mill—is brought into contact with the alkali liquid in the gas-liquid contacting apparatus 75. The carbon dioxide scrubs the hydrosulfide ions from the green liquor or white liquor producing a sulfide-depleted alkali liquid which is added to the reactor 33, and is used to increase the pH of the filtrate in line 32 (which can be oxidized as indicated at box 44 in FIG. 2) so that the ultimate filtrate produced in line 41 can be used more effectively in the bleach plant. Also, the carbon dioxide has a further benefit of increasing the carbonate content of the alkali source. The presence of the carbonate ion reduces the solubility of manganese and calcium so that those metals will more readily precipitate out of the filtrate from line 32 when the pH is increased in reactor 33. Also the carbonate ion extends (lowers) the pH range in which those metals will precipitate, resulting in a more desirable product-filtrate in line 41.

The reactions of the carbon dioxide with the aqueous alkaline medium in line 36 are as follows:

1. $CO_2 + H_2O = H_2CO_3$ (carbonic acid)
2. $H_2CO_3 + OH^- = H_2O + HCO_3^{-1}$
3. $HCO_3^{-1} + OH^- = H_2O + CO_3^{-2}$ 4. $HCO_3^{-1} = HS^- = CO_3^{-2} + H_2S(g)$ By treating the alkaline medium with $CO_2$ in 75, the metal content and the sulfide content of the recycled effluent in line 41 is reduced. Subsequent use of the effluent 41 in a bleach plant reduces the consumption of bleaching chemical by undesirable side reactions that would occur if the effluent were untreated. Thus, less bleaching chemical can be used to obtain the same level of brightness or a higher brightness can be obtained with the same chemical charge.

Figure 6:
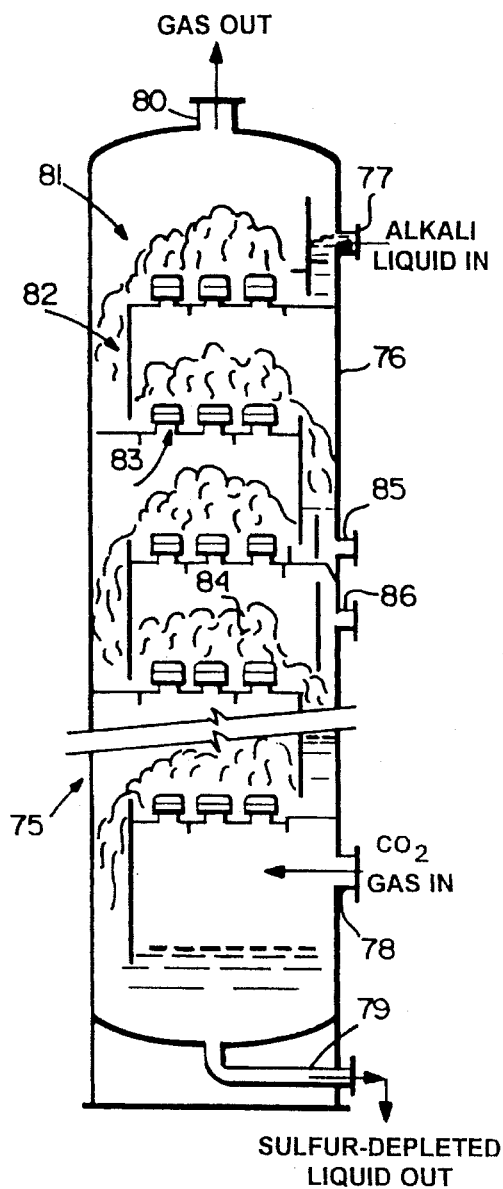
FIGS. 6 and 7 are side schematic cross-sectional views illustrating exemplary commercial apparatus for scrubbing liquor with carbon dioxide gas, according to the present invention.
Figure 7:
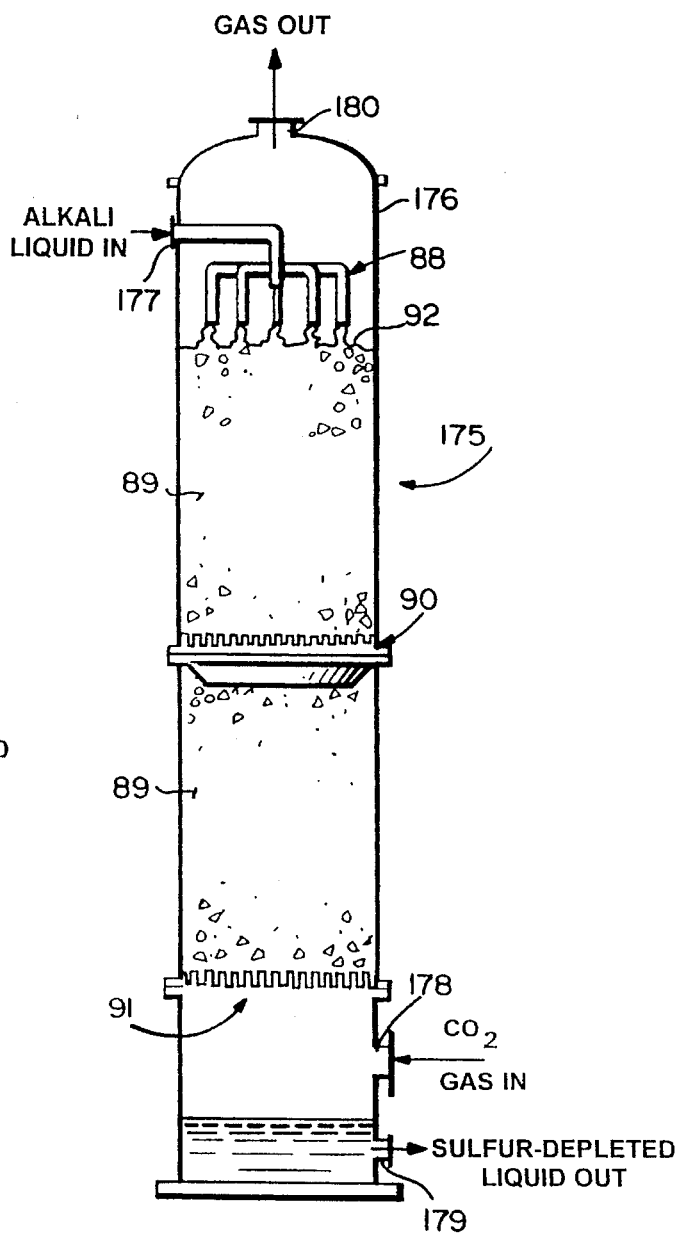

There are a wide variety of commercially available gas-liquid contacting systems that may be utilized as the system 75 in FIG. 5. Two such systems are illustrated in FIGS. 6 and 7. FIG. 6 schematically illustrates a plate column scrubber, while FIG. 7 schematically illustrates a stationary packing scrubber, which are successful in effecting gas absorption in gas-liquid contacting procedures.

In FIG. 6 the treatment apparatus 75 includes an upright vessel 76 having the alkali liquid inlet 77 (for green or white liquor from line 36), a carbon dioxide gas inlet 78, a sulfide-depleted liquid outlet 79, and a gas outlet 80. A plurality of tray assemblies 81 are provided, with downspouts 82 extending between each tray assembly 81, and a tray support ring or tray stiffener 83 provided at the bottom of each tray. Foam—illustrated schematically at 84—is produced during the gas-liquid contacting, and an additional outlet 85 can be provided for side stream withdrawal, while an intermediate feed 86 can also be provided for feeding an additional alkali liquid. Thus the carbon dioxide gas passes in a counter current manner to the falling alkali liquid, resulting in production of hydrosulfide gas from the dissolved hydrosulfide ions in the liquid, the hydrosulfide gas—as well as any other by-product gases, remaining carbon dioxide, or the like—are removed at 80. While it is preferred that the carbon dioxide gas be essentially pure carbon dioxide (e.g. greater than 90% carbon dioxide), enhanced carbon dioxide content air (e.g. flue gases from a lime kiln) also may be utilized.

FIG. 7 illustrates a stationary packing scrubber 175. Components in the FIG. 7 embodiment comparable to those in the FIG. 6 embodiment are shown by the same reference numeral only preceded by a "1", so attention is directed to the description of FIG. 6 for those elements.

In FIG. 7, the apparatus differs from that of FIG. 6 in that a particular type of liquid distributor 88 is utilized, which feeds the alkali liquid (e.g. green or white liquor) through a packing retainer 92 to a first bed of particles 89 having random packing. The liquid introduced at 177—which is flowing countercurrent to the carbon dioxide gas introduced at 178—passes through a liquid redistributor 90, and ultimately through the packing support 91 for exiting out 179, while the hydrogen sulfide containing spent gas passes out outlet 180.

The $H_2S$ and thiosulfate removal and carbonate enrichment are practiced according to the invention without adversely affecting the pulp mill's sulfur/sodium balance, e.g. by using liquor streams and $CO_2$ sources that are readily available in a typical mill. No additional chemicals need be imported.

It will thus be seen that according to the present invention a method and apparatus are provided which facilitate the precipitation of metals from acidic liquid streams while producing a product filtrate low in all bleaching chemical-consuming components, and high in carbonate content. While the invention has been herein shown and described in what is present conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A method of removing bleaching-chemical-consuming metals from treatment fluids in a cellulose pulp mill having a bleach plant, comprising the steps of substantially continuously:

(a) treating digested pulp m an acidic or neutral stage to dissolve metals;

(b) washing or thickening the pulp immediately after step (a) to produce a filtrate containing dissolved metals;

(c) treating an alkali liquid containing bleaching chemical-consuming sulfides with carbon dioxide to reduce the sulfide content and to increase the carbonate content of the alkali liquid;

(d) using the alkali liquid produced in step (c) to adjust the pH of the filtrate from step (b) to cause dissolved metals to precipitate as solids in the pH adjusted filtrate;

(e) removing the precipitated solids from the filtrate; and (f) using the reduced metal content filtrate from step (e) in the bleach plant of the pulp mill.

2. A method as recited in claim 1 wherein step (c) is practiced by treating green liquor or white liquor so as to remove dissolved hydrosulfide and thiosulfate ions therefrom.

3. A method as recited in claim 2 wherein step (c) is practiced by absorbing carbon dioxide into the liquor.

4. A method as recited in claim 3 wherein step (c) is practiced using a plate-column absorption device.

5. A method as recited in claim 3 wherein step (c) is practiced using a stationary packing absorption device.

6. A method as recited in claim 2 wherein step (e) is practiced by filtration, flotation, or sedimentation.

7. A method as recited in claim 2 comprising the further step of oxidizing the filtrate from step (b) prior to step (d) in order to increase the valence of the dissolved metals so that they become easier to precipitate or flocculate.

8. A method as recited in claim 7 wherein step (d) is practiced to adjust the pH of the filtrate so that it is in the range of about 6–11.

9. A method as recited in claim 2 wherein step (c) is practiced using carbon dioxide gas produced during combustion in a recovery boiler, hog-fuel boiler, or lime kiln of the pulp mill.

10. A method as recited in claim 2 wherein step (d) is practiced to adjust the pH of the filtrate so that it is in the range of about 8–11.

11. A method as recited in claim 2 wherein steps (a)–(f) are practiced to produce a filtrate having a carbonate level of at least about 0.05 mole/l.

12. A method as recited in claim 1 wherein steps (a)–(f) are practiced to produce a filtrate having a carbonate level of at least about 0.05 mole/l.

13. A method as recited in claim 1 wherein step (e) is practiced by filtration, flotation, or sedimentation.

14. A method as recited in claim 13 wherein step (c) is practiced by treating green liquor so as to remove dissolved hydrosulfide and thiosulfate ions therefrom.

15. A method as recited in claim 14 wherein step (c) is practiced by absorbing carbon dioxide into the liquor.

16. A method as recited in claim 13 wherein step (c) is practiced by treating white liquor so as to remove dissolved hydrosulfite and thiosulfate ions therefrom.

17. A method as recited in claim 16 wherein step (c) is practiced using a plate-column absorption device or stationary packing absorption device.

18. A method as recited in claim 16 wherein step (c) is practiced using carbon dioxide gas produced during combustion in a recovery boiler, hog-fuel boiler, or lime kiln of the pulp mill.

19. A method as recited in claim 13 comprising the further step of oxidizing the filtrate from step (b) prior to step (d) in order to increase the valence of the dissolved metals so that they become easier to precipitate or flocculate.

20. A method as recited in claim 13 wherein step (d) is practiced to adjust the pH of the filtrate so that it is in the range of about 8–11.

* * * * *